(12) United States Patent
Rajagopal et al.

(10) Patent No.: US 11,962,856 B2
(45) Date of Patent: *Apr. 16, 2024

(54) SYSTEMS AND METHODS FOR GENERATING A RECOMMENDATION OF A MEDIA ASSET FOR SIMULTANEOUS CONSUMPTION WITH A CURRENT MEDIA ASSET

(71) Applicant: Rovi Guides, Inc., San Jose, CA (US)

(72) Inventors: Anitha Rajagopal, Southborough, MA (US); Abhishek Banerjee, Framingham, MA (US); Vijayasekhar Mekala, Stoneham, MA (US); Mitsu Deshpande, Waltham, MA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/141,749

(22) Filed: May 1, 2023

(65) Prior Publication Data

US 2023/0276097 A1 Aug. 31, 2023

Related U.S. Application Data

(63) Continuation of application No. 17/964,482, filed on Oct. 12, 2022, now Pat. No. 11,689,770, which is a
(Continued)

(51) Int. Cl.
*H04N 21/466* (2011.01)
*H04N 21/442* (2011.01)
(Continued)

(52) U.S. Cl.
CPC ... *H04N 21/4667* (2013.01); *H04N 21/44213* (2013.01); *H04N 21/44222* (2013.01);
(Continued)

(58) Field of Classification Search
CPC ......... H04N 21/4667; H04N 21/44213; H04N 21/44222; H04N 21/44226; H04N 21/4668; H04N 21/4821; H04N 21/4882
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |
| 7,165,098 B1 | 1/2007 | Boyer et al. |
| 7,761,892 B2 | 7/2010 | Ellis et al. |

(Continued)

FOREIGN PATENT DOCUMENTS

| EP | 2993908 A1 | 3/2016 |
| JP | 2003174598 A | 6/2003 |

(Continued)

*Primary Examiner* — Kunal Langhnoja
(74) *Attorney, Agent, or Firm* — Haley Guiliano LLP

(57) ABSTRACT

Systems and methods for, while a user is consuming a first media asset, generating for the user a recommendation of a second media asset based on a viewing history of the user. In some aspects, the systems and methods determine that a user is consuming only video of a first media asset, determine a first category for the first media asset, and retrieve a viewing history corresponding to the user. The viewing history comprises media assets consumed simultaneously with a media asset corresponding to the first category. The systems and methods select a second category corresponding to a highest number of media assets in the viewing history, select a second media asset based on the second category. Alternatively, the user can select the second media asset manually. The systems and methods generate for output the audio of the second media asset for simultaneous consumption with the video of the first media asset.

14 Claims, 10 Drawing Sheets

Related U.S. Application Data continuation of application No. 17/526,439, filed on Nov. 15, 2021, now Pat. No. 11,503,371, which is a continuation of application No. 16/711,044, filed on Dec. 11, 2019, now Pat. No. 11,206,454, which is a continuation of application No. 16/207,993, filed on Dec. 3, 2018, now Pat. No. 10,542,318, which is a continuation of application No. 15/654,421, filed on Jul. 19, 2017, now Pat. No. 10,149,012.

(51) Int. Cl.
*H04N 21/482* (2011.01)
*H04N 21/488* (2011.01)

(52) U.S. Cl.
CPC ... *H04N 21/44226* (2020.08); *H04N 21/4668* (2013.01); *H04N 21/4821* (2013.01); *H04N 21/4882* (2013.01)

(56) References Cited

U.S. PATENT DOCUMENTS

| | | |
|---|---|---|
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2008/0271078 A1* | 10/2008 | Gossweiler ............ H04N 21/47 725/40 |
| 2010/0153885 A1 | 6/2010 | Yates |
| 2014/0280879 A1* | 9/2014 | Skolicki .................. H04L 69/28 709/224 |
| 2014/0359647 A1* | 12/2014 | Shoemake ......... H04N 21/6582 725/10 |
| 2016/0192005 A1 | 6/2016 | Larson et al. |
| 2017/0048582 A1 | 2/2017 | Zhang et al. |
| 2017/0228774 A1* | 8/2017 | Sallas ................ G06Q 30/0255 |
| 2022/0078518 A1 | 3/2022 | Rajagopal et al. |
| 2023/0034909 A1 | 2/2023 | Rajagopal et al. |

FOREIGN PATENT DOCUMENTS

| | | |
|---|---|---|
| JP | 2006500674 A | 1/2006 |
| JP | 2008187553 A | 8/2008 |

\* cited by examiner

SYSTEMS AND METHODS FOR GENERATING A RECOMMENDATION OF A MEDIA ASSET FOR SIMULTANEOUS CONSUMPTION WITH A CURRENT MEDIA ASSET

CROSS REFERENCE TO RELATED APPLICATIONS

This application is a continuation of U.S. patent application Ser. No. 17/964,482, filed Oct. 12, 2022, which is a continuation of U.S. patent application Ser. No. 17/526,439, filed Nov. 15, 2021, now U.S. Pat. No. 11,503,371, which is a continuation of U.S. patent application Ser. No. 16/711,044, filed Dec. 11, 2019, now U.S. Pat. No. 11,206,454, which is a continuation of U.S. patent application Ser. No. 16/207,993, filed Dec. 3, 2018, now U.S. Pat. No. 10,542,318, which is a continuation of U.S. patent application Ser. No. 15/654,421, filed Jul. 19, 2017, now U.S. Pat. No. 10,149,012, the disclosures of which are hereby incorporated by reference herein in their entireties.

BACKGROUND

In traditional media systems, if desired, a user can consume audio from a first program and video from a second program. For example, the user may listen to the news (i.e., first program) via a tablet computer while watching a sports event (i.e., second program) on a television having the sound muted. In another example, the user may both listen to the news (i.e., first program) and watch a sports event (i.e., second program) via the same device, such as laptop computer. Typically the user is required to manually select the first and second program on the target devices in order to accomplish this setup. However, traditional media systems fail to provide recommendations of, e.g., audio of another program while the user is consuming video of a particular program.

SUMMARY

Systems and methods are provided herein for generating a recommendation of a media asset for simultaneous consumption with a current media asset being viewed by a user of a media guidance application. The media guidance application may determine that the user is consuming only the video of a first media asset. For example, the media guidance application may determine that the user is watching a baseball game with the sound muted. The media guidance application may determine the category of the first media asset. For example, the media guidance application may determine that the baseball game is a sport event. The media guidance application may retrieve the user's viewing history. For example, the media guidance application may retrieve information about other times at which the user was watching a muted sport event. The media guidance application may determine a second category that the user prefers to consume simultaneously with the media assets from the first category. For example, the media guidance application may determine that the user likes to listen to the news while watching sport events. The media guidance application may generate for recommendation a second media asset of a second category, selected from a media database. For example, the media guidance application may recommend that the user listen to a CNN news program.

In some aspects, the media guidance application may receive a first media asset currently being consumed by a user. Further, the first media asset comprises a first component of a first type and a second component of a second type. Additionally, the first type comprises one of audio and video, the second type also comprises one of audio and video, but the second type is different from the first type. For example, the media guidance application may receive a baseball game currently being watched by a user. The baseball game may have a video component and an audio component. Further, the media guidance application may determine that the user is consuming only the first component of the first type of the first media asset. For example, the media guidance application may determine that the user is only watching the baseball game, with the sound muted, thus consuming only the video of the baseball game.

In some embodiments, the media guidance application may retrieve a set of metadata associated with the first media asset. For example, the media guidance application may retrieve the metadata associated with the baseball game. Further, the media guidance application may determine a first category for the first media asset based on the set of metadata. For example, the media guidance application may determine that the baseball game is a sport event based on the metadata. The media guidance application may retrieve a viewing history corresponding to the user. The viewing history includes media assets consumed simultaneously with a media asset that includes a component of the first type. For example, the media guidance application may retrieve the viewing history of the user including information about previous times when the user watched a muted sport event and listened to another program. Further, the media guidance application may determine a plurality of categories corresponding to the plurality of media assets. For example, the media guidance application may determine that in the past, when the user watched muted sports events he either listened to podcasts or the news.

In some embodiments, the media guidance application may retrieve a data structure that indicates a number of occurrences of media assets of the plurality of media assets for each category of the plurality of categories. Further, each entry in the data structure corresponds to a respective category from the plurality of categories and each entry is representative of a number of media assets of the plurality of media assets that corresponds to the respective category. For example, the media guidance application may retrieve a data structure that indicates that the user previously watched a muted sport event and listened to a podcast ten times and the user previously watched a muted sport event and listened to news for ninety times. Further, the media guidance application may search for a second category corresponding to an entry from the data structure corresponding to a number of media assets greater than a number of media assets corresponding to any other entry. For example, the media guidance application may determine that the second category is news since the user listened to news more often than he or she listened to podcasts while watching a muted sport event.

In some embodiments, the media guidance application may select, from a media database, a second media asset based on the second category. Further, the second media asset comprises a third component of a third type. The third type comprises one of audio and video, and the third type is different from the first type. For example, the media guidance application may select a CNN News program that has at least an audio component but may also have the video component. Further, the media guidance application may generate for display a recommendation of the third component of the third type of the second media asset for simultaneous consumption with the first component of the first type of the first media asset. For example, the media guidance application may recommend that the user listens to the CNN News program while watching the muted baseball game.

In some embodiments, the media guidance application may, when determining that the user is consuming only the first component of the first type of the first media asset, determine one or more user equipment that allows the user to consume the second component of the second type. For example, the media guidance application may determine that only the user's speaker can allow the user to listen to the baseball game. Further, the media guidance application may determine that each of the one or more user equipment is disabled. For example, the media guidance application may determine that the speaker is muted or disconnected completely.

In some embodiments, the media guidance application may, when determining that the user is consuming only the first component of the first type of the first media asset, receive input from a sensor that the user is not consuming the second component of the second type. The sensor may be monitoring the user while the user is consuming the second component of the second type. For example, the media guidance application may receive input from an image recognition system indicating that the user is listening to audio from a source other than the baseball game. Thus, the media guidance application may determine that the user is actually not consuming the audio of the baseball game.

In some embodiments, the media guidance application may, when searching for the second category corresponding to the entry from the data structure corresponding to the number of media assets greater than the number of media assets corresponding to any other entry, determine one or more entries corresponding to the plurality of media assets. For example, the media guidance application may determine that the user had previously watched a muted baseball game and listened to another media asset one hundred times. Further, the media guidance application may determine one or more categories based on the one or more entries. For example, the media guidance application may determine that the user listened to podcasts or news. The media guidance application may determine one or more numbers of media assets for the one or more categories, the one or more numbers of media assets is representative of a number of media assets corresponding to each category from the one or more categories. For example, the media guidance application may determine that the user listened ten times to podcasts and ninety times to news while watching a muted sport event.

In some embodiments, the media guidance application may, when selecting from the media database, select the second media asset based on the second category, determine a subset of media assets from the media database corresponding to the second category. For example, the media guidance application may determine ten news programs that are available to the user. Further, the media guidance application may retrieve a rating for each media asset from the subset of media assets. For example, the media guidance application may retrieve a review rating for each of the news programs. The media guidance application may search for the second media asset in the subset of media assets, the second media asset has a corresponding rating greater than a corresponding rating for any other media asset from the subset of media assets. For example, the media guidance application may determine that the CNN News program has the highest review rating among the ten available news programs.

In some embodiments, the media guidance application may generate for output the first component of the first type of the first media asset on a first device. For example, the media guidance application may allow the user to watch the muted baseball game on a first television. Further, the media guidance application may generate for output the third component of the third type of the second media asset on a second device. For example, the media guidance application may use a second television to play the audio from CNN News.

In some embodiments, the media guidance application may generate for output the first component of the first type of the first media asset on a first device and generate for output the third component of the third type of the second media asset on the first device. For example, the media guidance application may allow the user to watch the muted baseball game and listen to the CNN News program on the same TV.

In some embodiments, the media guidance application may receive an input from the user to generate for output the second component of the second type of the first media asset. For example, the media guidance application may receive input from the user to turn on the audio of the baseball game. Further, the media guidance application may determine whether the first device supports generating for output components of the second type. For example, the media guidance application may determine whether the first TV has a speaker or another device that would allow it to generate audio for output. The media guidance application may, in response to determining that the first device supports generating for output components of the second type, generate for output the second component. For example, if the media guidance application may determine that the first TV is capable of generating audio for output, the media guidance application may generate for output the audio of the baseball game. The media guidance application may determine whether the second type is identical to the third type. For example, the media guidance application may determine whether the user is currently consuming the audio of the CNN News program. Further, the media guidance application may, in response to determining that the second type is identical to the third type, cease generating for output the third component of the third type. For example, the media guidance application may stop generating for output the audio from the CNN News if the user was previously listening to CNN News.

In some embodiments, the media guidance application may receive an input from the user to generate for output a fourth component of the first type. For example, the media guidance application may receive an input from the user to start showing the video of the CNN News program. Further, the media guidance application may, in response to receiving the input from the user, determine whether the second media asset has the fourth component of the first type. For example, the media guidance application may determine whether the CNN News program has a video track. The media guidance application may, in response to determining that the second media asset has the fourth component of the first type, generate for output the fourth component of the first type of the second media asset on the first device. For example, the media guidance application may, in response to determining that the CNN News program has a video track, display the video of the CNN News program on the first TV. Further, the media guidance application may generate for output the second component of the second type of the first media asset on the second device. For example, the media guidance application may generate for output the audio of the baseball game on the second TV.

In some embodiments, the media guidance application may receive an input from the user to generate for output the third component of the third type of the second media asset. For example, the media guidance application may receive an input from the user to generate for output the audio track of the CNN News program. Further, the media guidance application may determine whether the first device supports generating for output components of the third type. The media guidance application may, in response to determining that the first device supports generating for output components of the third type, generate for output the third component of the third type. Further, the media guidance application may determine whether the third type is identical to the second type. The media guidance application may, in response to determining that the third type is identical to the second type, cease the generation for output of the second component of the second type.

In some embodiments, the first device can be the same as the second device, therefore allowing the media guidance application to generate both media assets for output on the same device. Further, an option may be presented to the user to reject the recommendation and manually select the second media asset. Moreover, the user may manually select the second media asset at any point, without waiting for the recommendation from the media guidance application.

In some embodiments, the media guidance application may generate for output the video of the first media asset on the first device while generating for output the video and audio of the second media asset also on the first device. The generation may be triggered by a recommendation or by user input.

In some embodiments, the media guidance application may generate for output the video of the first media asset on the first device while generating for output the video and audio of the second media asset also on the second device. The generation may be triggered by a recommendation or by user input.

In some embodiments, the media guidance application may generate for output the video and audio of the first media asset on the first device while generating for output the video of the second media asset also on the first device. The generation may be triggered by a recommendation or by user input.

In some embodiments, the media guidance application may generate for output the video and audio of the first media asset on the first device while generating for output the video of the second media asset also on the second device. The generation may be triggered by a recommendation or by user input.

The described systems and methods enable the user to select which media asset is delivered for video-only output and which media asset is delivered for audio-only output. Further, the two media assets may be allocated to two different television screens. For example, the media asset that is delivered for video-only output is displayed on the first screen and the media asset delivered for audio-only output is sent to the second screen. Further, the user may elect whether to display the video of the second media asset on the second screen.

In some embodiments, the media guidance application may allow the user to swap or switch between the video and audio components while watching two media assets. For example, the user can send the CNN News program to the first screen to see the video of the CNN News program while sending the baseball game to the second screen and consuming the audio of the baseball game. [need setup example and then swap example; there is only one example here]

The conventional approach to allowing the user to consume the audio from the first media asset and the video from the second media asset is for the user to manually select the first and second media assets. The systems and methods described herein provide a solution that allows the media guidance application to provide the user with recommendations, for example, of the audio of a second media asset to be consumed simultaneously with the video of the first media asset. This solution may be achieved by a media guidance application that determines that a user is consuming only video of a first media asset. Further, the media guidance application determines a first category for the first media asset and retrieves a viewing history corresponding to the user. The viewing history comprises a plurality of media assets consumed simultaneously with a media asset corresponding to the first category wherein the media asset includes video. The media guidance application then selects a second category corresponding to the highest number of media assets in the plurality of media assets and further selects, from a media database, a second media asset based on the second category, and generates for display a recommendation of the audio of the second media asset for simultaneous consumption with the video of the first media asset.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for generating a recommendation of a media asset for simultaneous consumption with a current media asset. The media guidance application may determine that a user is consuming only the video of a first media asset. For example, the media guidance application may determine that the user is watching a muted baseball game. The media guidance application may determine the category of the first media asset. For example, the media guidance application may determine that the baseball game is a sport event. The media guidance application may retrieve the user's viewing history. For example, the media guidance application may retrieve information about other times at which the user was watching a muted sport event. The media guidance application may determine a second category that the user prefers to consume simultaneously with the media assets from the first category. For example, the media guidance application may determine that the user likes to listen to news while watching sport events. The media guidance application may generate for recommendation a second media asset of a second category, selected from a media database. For example, the media guidance application may recommend that the user listens to a CNN news program.

Figure 1:
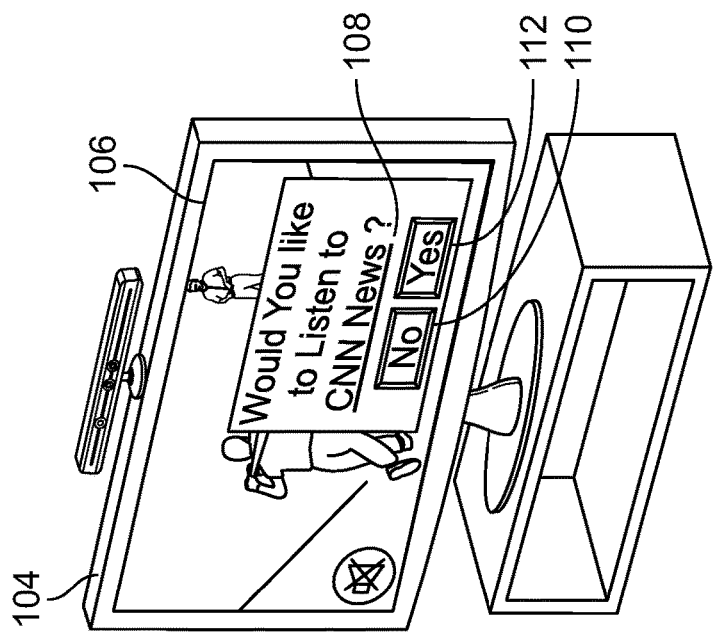
FIG. 1 shows an illustrative example for an interactive media guidance application for generating a recommendation of a media asset for simultaneous consumption with a current media asset, in accordance with some embodiments of the disclosure.
Figure 1:
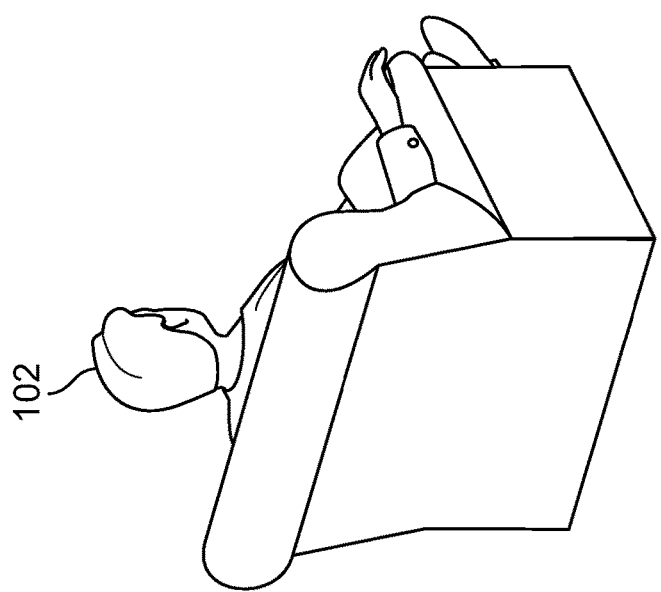

FIG. 1 shows an illustrative example for an interactive media guidance application for generating a recommendation of a media asset for simultaneous consumption with a current media asset, in accordance with some embodiments of the disclosure. As depicted, FIG. 1 includes user 102, first device 104, first media asset 106, second media asset 108, and selectable options 110 and 112. The media guidance application may generate for display recommendation 108 and user 102 may accept recommendation 108 by selecting selectable option 112 or rejecting recommendation 108 by selecting selectable option 110.

Figure 2:
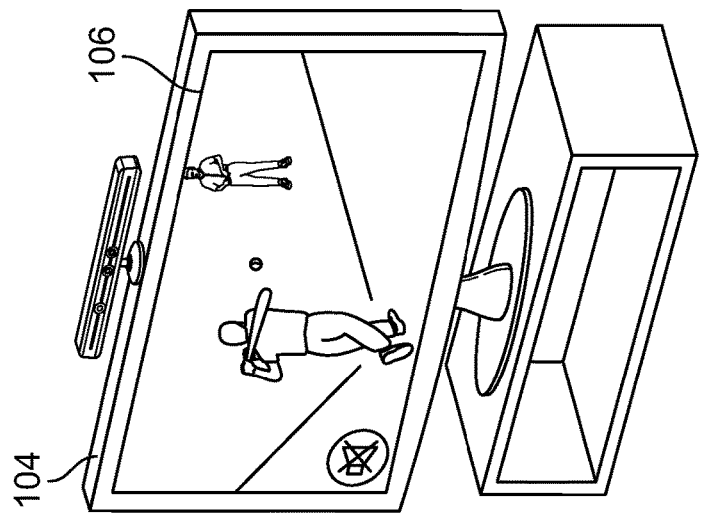
FIG. 2 shows an illustrative example for an interactive media guidance application for allowing the user to consume two media assets at the same time on two devices, in accordance with some embodiments of the disclosure.
Figure 2:
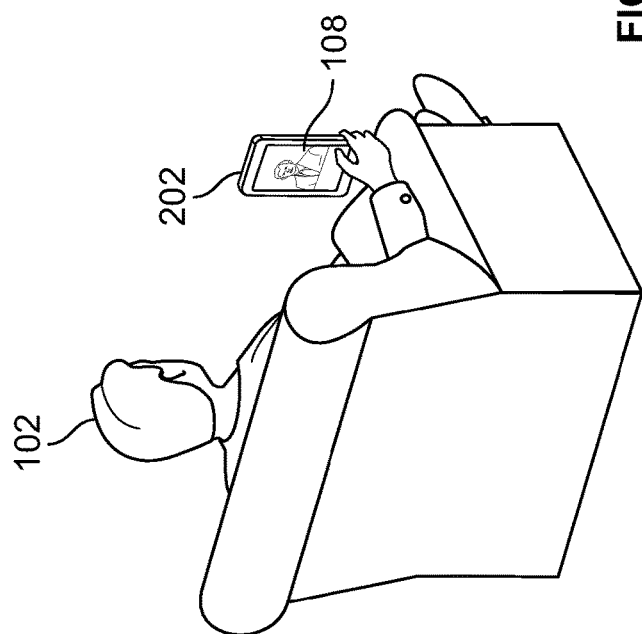
Figure 2:
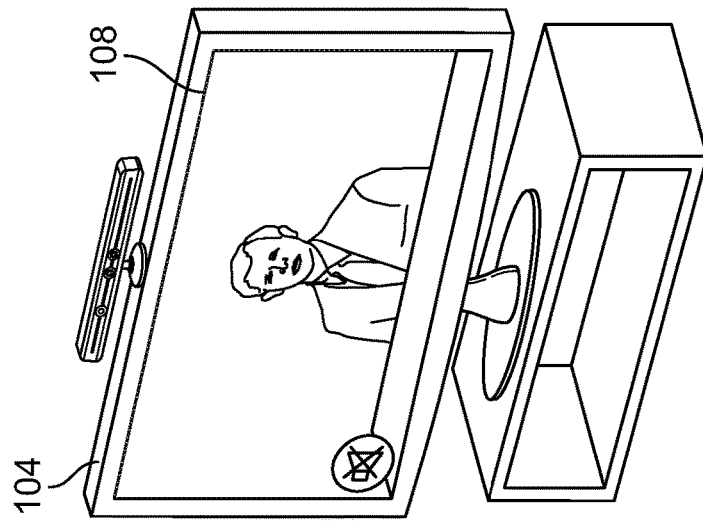
Figure 2:
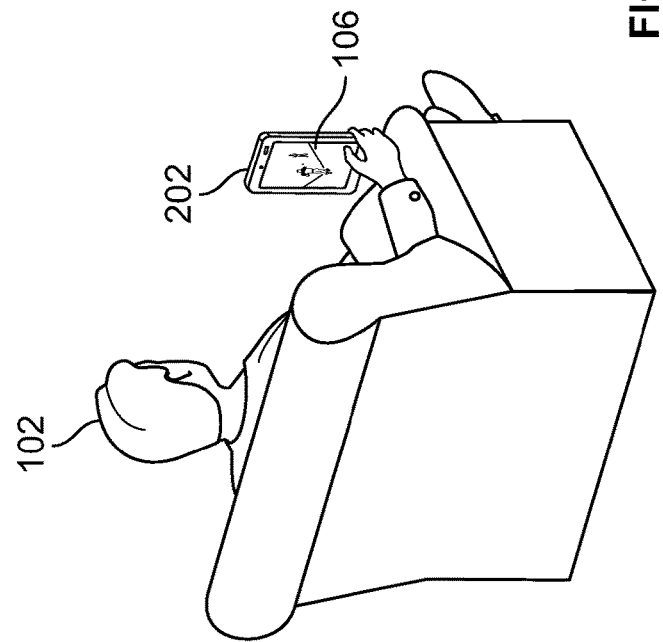

FIG. 2 shows an illustrative example 200 for an interactive media guidance application for allowing user 102 to consume two media assets at the same time on two devices, in accordance with some embodiments of the disclosure. As depicted, the illustrative example 200 of FIG. 2 includes user 102, first device 104, first media asset 106, second media asset 108, and second device 202. The audio and optionally the video of second media asset 108 can be generated for output. The generation for output can be triggered by a recommendation or by the user input.

FIG. 2 also shows an illustrative example 250 for an interactive media guidance application for allowing user 102 to consume two media assets at the same time on two devices, in accordance with some embodiments of the disclosure. As depicted, the illustrative example 250 of FIG. 2 includes user 102, first device 104, first media asset 106, second media asset 108, and second device 202. The audio and optionally the video of first media asset 106 can be generated for output. The generation for output can be triggered by a recommendation or by the user input.

Figure 3:
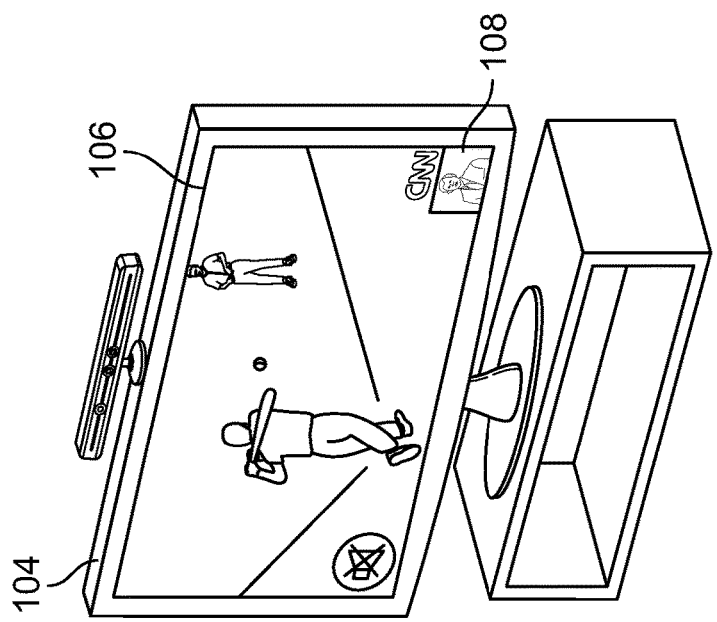
FIG. 3 shows another illustrative example for an interactive media guidance application for allowing the user to consume two media assets at the same time on the same device, in accordance with some embodiments of the disclosure.
Figure 3:
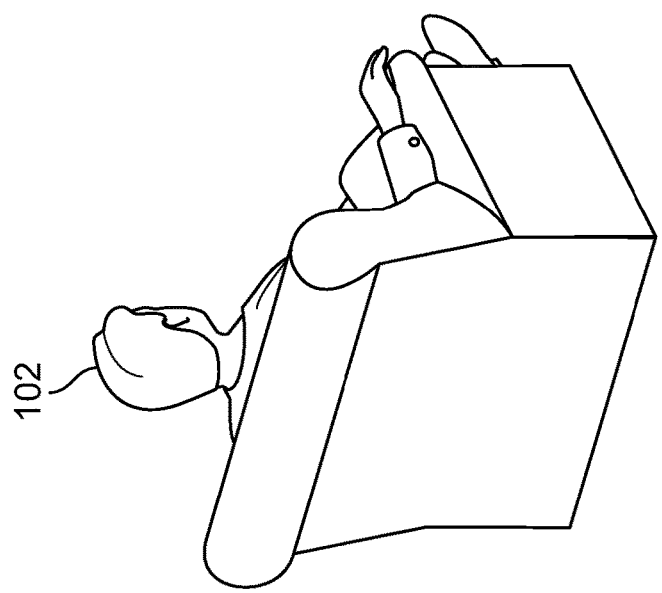
Figure 3:
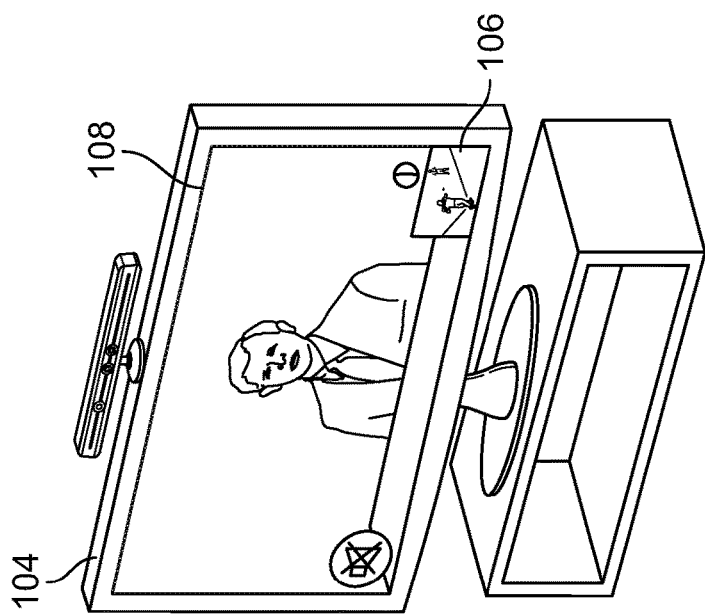
Figure 3:
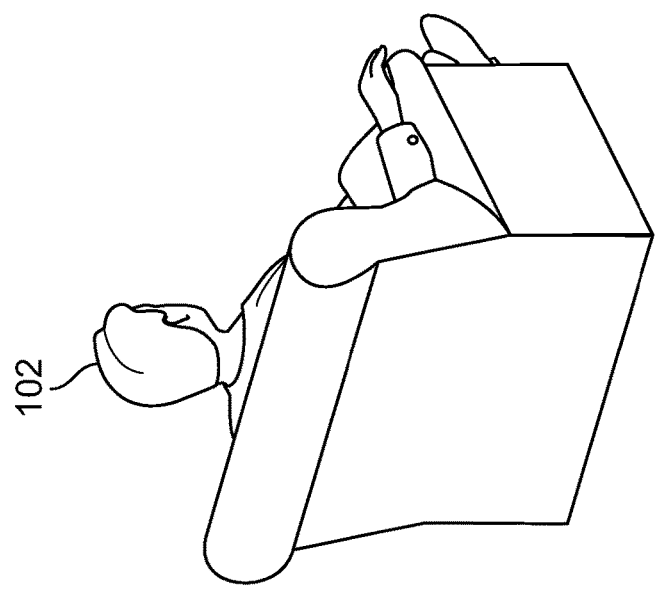

FIG. 3 shows illustrative example 300 for an interactive media guidance application for allowing the user to consume two media assets at the same time on the same device, in accordance with some embodiments of the disclosure. As depicted, illustrative example 300 of FIG. 3 includes user 102, first device 104, first media asset 106, and second media asset 108. The audio and optionally the video of second media asset 108 can be generated for output. The generation for output can be triggered by a recommendation or by the user input.

FIG. 3 also shows illustrative example 350 for an interactive media guidance application for allowing the user to consume two media assets at the same time on the same device, in accordance with some embodiments of the disclosure. As depicted, illustrative example 350 of FIG. 3 includes user 102, first device 104, first media asset 106, and second media asset 108. The audio and optionally the video of first media asset 106 can be generated for output. The generation for output can be triggered by a recommendation or by the user input.

As used herein, the term "type" is defined to mean a component of a media asset. Examples of such components are video component, audio component, image component, logo component, and the like. As used herein, the term "category" is defined to mean a genre of a media asset. Examples of such genres news, sports, podcast, action, drama, crime, fantasy, historical, and the like.

In some aspects, the media guidance application may receive a first media asset 106 currently being consumed by user 102. Further, the first media asset 106 comprises a first component of a first type and a second component of a second type. Additionally, the first type comprises one of audio and video, the second type comprises one of audio and video, and the second type is different from the first type. For example, the media guidance application may receive a baseball game currently being watched by user 102. The baseball game may have a video component and an audio component. Further, the media guidance application may determine that user 102 is consuming only the first component of the first type of the first media asset 106. For example, the media guidance application may determine that user 102 is only watching the baseball game, with the sound muted, thus consuming only the video of the baseball game.

In some embodiments, the media guidance application may retrieve a set of metadata associated with the first media asset 106. For example, the media guidance application may retrieve the metadata associated with the baseball game. Further, the media guidance application may determine a first category for the first media asset 106 based on the set of metadata. For example, the media guidance application may determine that the baseball game is a sport event based on the metadata. The media guidance application may retrieve a viewing history corresponding to user 102. The viewing history includes media assets consumed simultaneously with a media asset that includes a component of the first type. For example, the media guidance application may retrieve the viewing history of user 102 including information about previous times when user 102 watched a muted sport event and listened to another program. Further, the media guidance application may determine a plurality of categories corresponding to the plurality of media assets. For example, the media guidance application may determine that, in the past, when user 102 watched muted sports events, he either listened to podcasts or the news.

In some embodiments, the media guidance application may retrieve a data structure that indicates a number of occurrences of media assets of the plurality of media assets for each category of the plurality of categories. Further, each entry in the data structure corresponds to a respective category from the plurality of categories and each entry is representative of a number of media assets of the plurality of media assets that corresponds to the respective category. For example, the media guidance application may retrieve a data structure that indicates that user 102 previously watched a muted sport event and listened to a podcast ten times and user 102 previously watched a muted sport event and listened to news ninety times. Further, the media guidance application may search for a second category corresponding to an entry from the data structure corresponding to a number of media assets greater than a number of media assets corresponding to any other entry. For example, the media guidance application may determine that the second category is news since user 102 listened to news more often than to listened to podcasts while watching a muted sport event.

In some embodiments, the media guidance application may select, from a media database, a second media asset 108 based on the second category. Further, the second media asset 108 comprises a third component of a third type. The third type comprises one of audio and video, and the third type is different from the first type. For example, the media guidance application may select a CNN News program that has at least an audio component but may also have the video component. Further, the media guidance application may generate for display a recommendation of the third component of the third type of the second media asset 108 for simultaneous consumption with the first component of the first type of the first media asset 106. For example, the media guidance application may recommend that user 102 listens to the CNN News program while watching the muted baseball game.

In some embodiments, the media guidance application may, when determining that user 102 is consuming only the first component of the first type of the first media asset 106, determine one or more user equipment that allows user 102 to consume the second component of the second type. For example, the media guidance application may determine that only the user's speaker can allow user 102 to listen to the baseball game. Further, the media guidance application may determine that each of the one or more user equipment is disabled. For example, the media guidance application may determine that the speaker is muted or disconnected completely.

In some embodiments, the media guidance application may, when determining that user 102 is consuming only the first component of the first type of the first media asset 106, receive input from a sensor that user 102 is not consuming the second component of the second type. The sensor may be monitoring user 102 while user 102 is consuming the second component of the second type. For example, the media guidance application may receive input from an image recognition system indicating that user 102 is listening to audio from a source other than the baseball game. Thus, the media guidance application may determine that user 102 is actually not consuming the audio of the baseball game.

In some embodiments, the media guidance application may, when searching for the second category corresponding to the entry from the data structure corresponding to the number of media assets greater than the number of media assets corresponding to any other entry, determine one or more entries corresponding to the plurality of media assets. For example, the media guidance application may determine that user 102 had previously watched a muted baseball game and listened to another media asset one hundred times. Further, the media guidance application may determine one or more categories based on the one or more entries. For example, the media guidance application may determine that user 102 listened to podcasts or news. The media guidance application may determine one or more numbers of media assets for the one or more categories, the one or more numbers of media assets is representative of a number of media assets corresponding to each category from the one or more categories. For example, the media guidance application may determine that user 102 listened ten times to podcasts and ninety times to news while watching a muted sport event.

In some embodiments, the media guidance application may, when selecting, from the media database, the second media asset 108 based on the second category, determine a subset of media assets from the media database corresponding to the second category. For example, the media guidance application may determine ten news programs that are available to user 102. Further, the media guidance application may retrieve a rating for each media asset from the subset of media assets. For example, the media guidance application may retrieve a review rating for each of the news programs. The media guidance application may search for the second media asset 108 in the subset of media assets, the second media asset 108 has a corresponding rating greater than a corresponding rating for any other media asset from the subset of media assets. For example, the media guidance application may determine that CNN News program has the highest review rating among the ten available news programs.

In some embodiments, the media guidance application may generate for output the first component of the first type of the first media asset 106 on a first device 104. For example, the media guidance application may allow user 102 to watch the muted baseball game on a first television. Further, the media guidance application may generate for output the third component of the third type of the second media asset 108 on a second device 202. For example, the media guidance application may use a second television to play the audio from CNN News.

In some embodiments, the media guidance application may generate for output the first component of the first type of the first media asset 106 on a first device 104 and generate for output the third component of the third type of the second media asset 108 on the first device 104. For example, the media guidance application may allow user 102 to watch the muted baseball game and listen to the CNN News program on the same TV.

In some embodiments, the media guidance application may receive an input from user 102 to generate for output the second component of the second type of the first media asset 106. For example, the media guidance application may receive input from user 102 to turn on the audio of the baseball game. Further, the media guidance application may determine whether the first device 104 supports generating for output components of the second type. For example, the media guidance application may determine whether the first TV has a speaker or another device that would allow it to generate audio for output. The media guidance application may, in response to determining that the first device 104 supports generating for output components of the second type, generate for output the second component. For example, if the media guidance application determines that the first TV is capable of generating audio for output, the media guidance application may generate for output the audio of the baseball game. The media guidance application may determine whether the second type is identical to the third type. For example, the media guidance application may determine whether user 102 is currently consuming the audio of the CNN News program. Further, the media guidance application may, in response to determining that the second type is identical to the third type, cease the generating for output of the third component of the third type. For example, the media guidance application may stop generating for output the audio from the CNN News if user 102 was previously listening to CNN News.

In some embodiments, the media guidance application may receive an input from user 102 to generate for output a fourth component of the first type. For example, the media guidance application may receive an input from user 102 to start showing the video of the CNN News program. Further, the media guidance application may, in response to receiving the input from user 102, determine whether the second media asset 108 has the fourth component of the first type. For example, the media guidance application may determine whether the CNN News program has a video track. The media guidance application may, in response to determining that the second media asset 108 has the fourth component of the first type, generate for output the fourth component of the first type of the second media asset 108 on the first device 104. For example, the media guidance application may, in response to determining that the CNN News program has a video track, display the video of the CNN News program on the first TV. Further, the media guidance application may generate for output the second component of the second type of the first media asset 106 on the second device 202. For example, the media guidance application may generate for output the audio of the baseball game on the second TV.

In some embodiments, the media guidance application may receive an input from user 102 to generate for output the third component of the third type of the second media asset 108. For example, the media guidance application may receive an input from user 102 to generate for output the audio track of the CNN News program. Further, the media guidance application may determine whether the first device 104 supports generating for output components of the third type. The media guidance application may, in response to determining that the first device 104 supports generating for output components of the third type, generate for output the third component of the third type. Further, the media guidance application may determine whether the third type is identical to the second type. The media guidance application may, in response to determining that the third type is identical to the second type, cease the generation for output of the second component of the second type.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
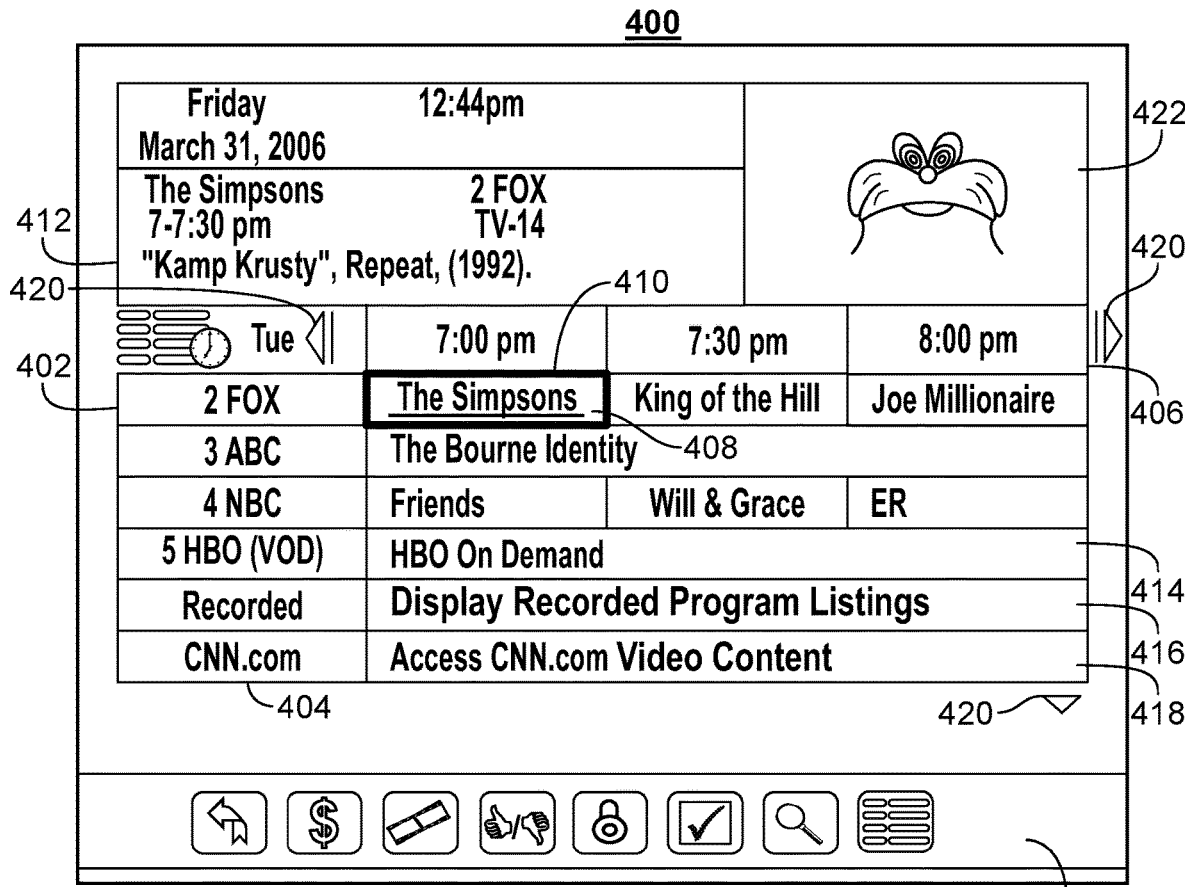
FIG. 4 shows an illustrative embodiment of a display screen that may be used to provide media guidance application listings and other media guidance information, in accordance with some embodiments of the disclosure.
Figure 5:
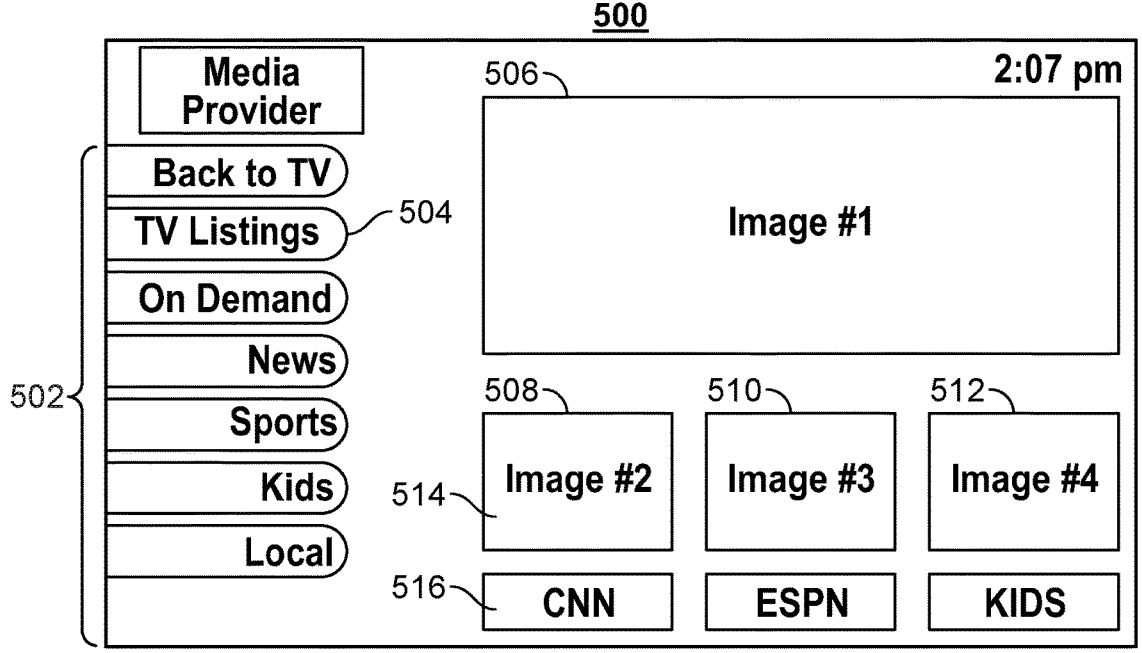
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
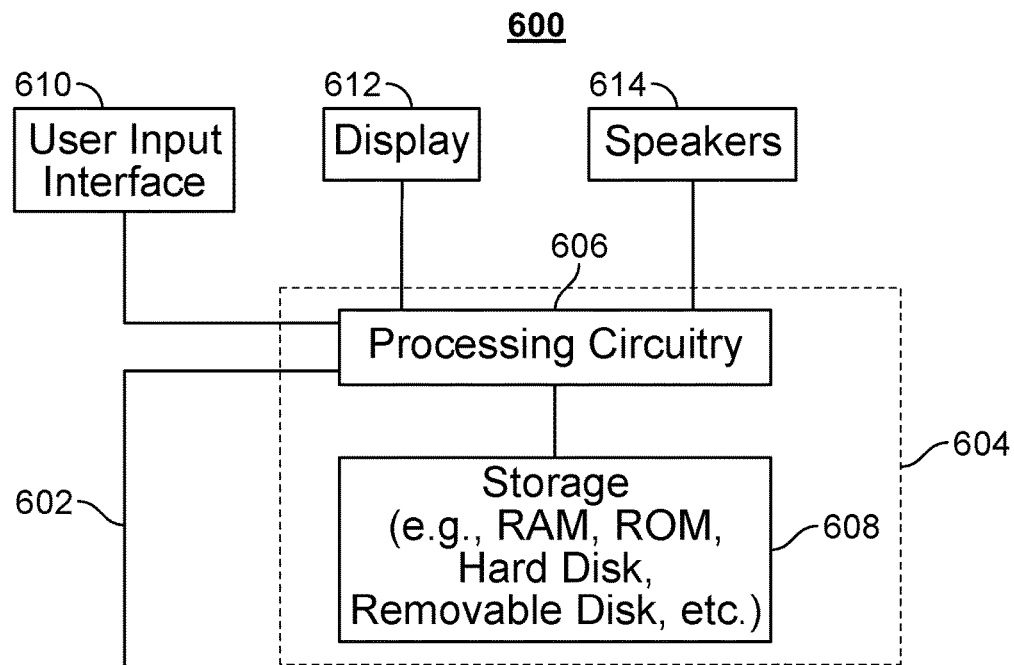
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
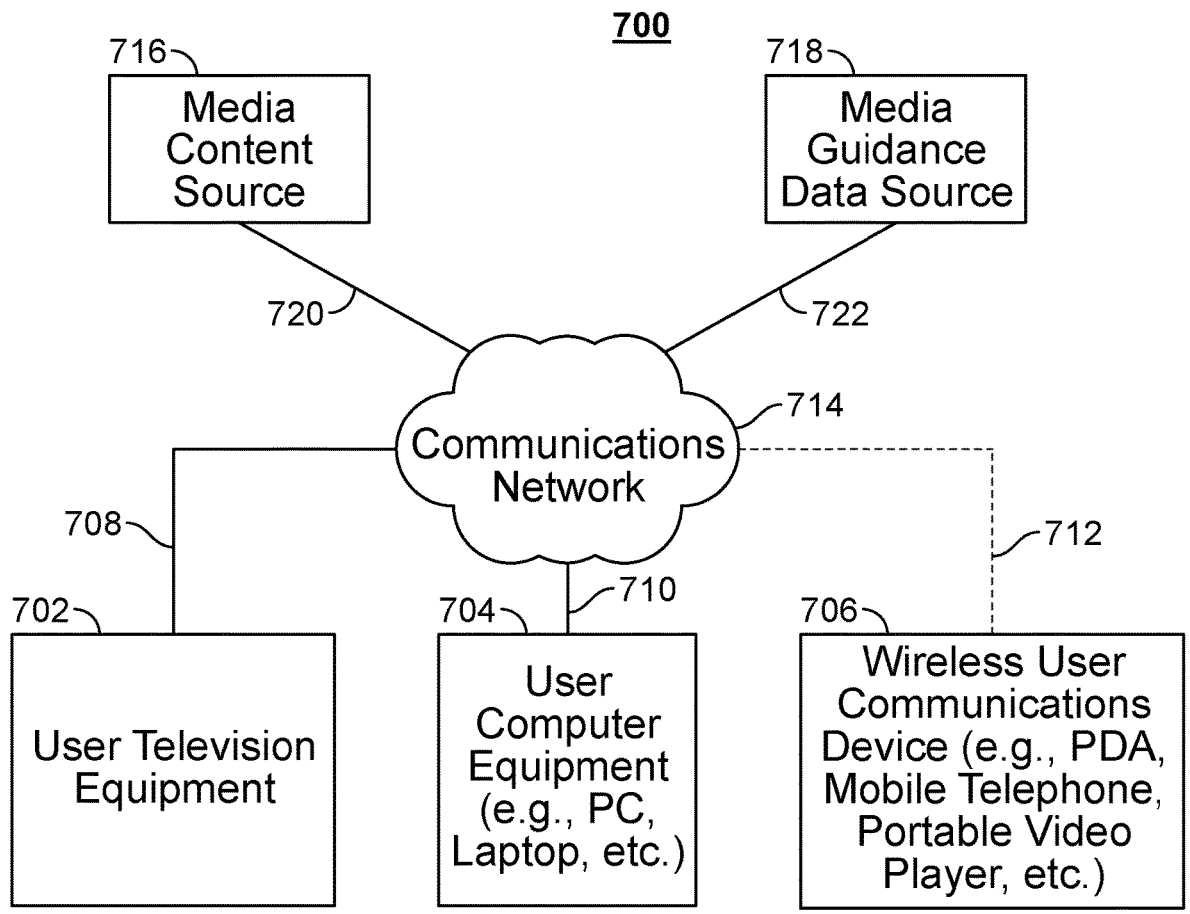
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device 104. In some embodiments, the second screen device provides an interface for adjusting settings and display preferences of the first device 104. In some embodiments, the second screen device is configured for interacting with other second screen devices or for interacting with a social network. The second screen device can be located in the same room as the first device 104, a different room from the first device 104 but in the same house or building, or in a different building from the first device 104.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to "caused by." For example, a first action being performed directly in response to a second action may not include interstitial steps between the first action and the second action.

Figure 8:
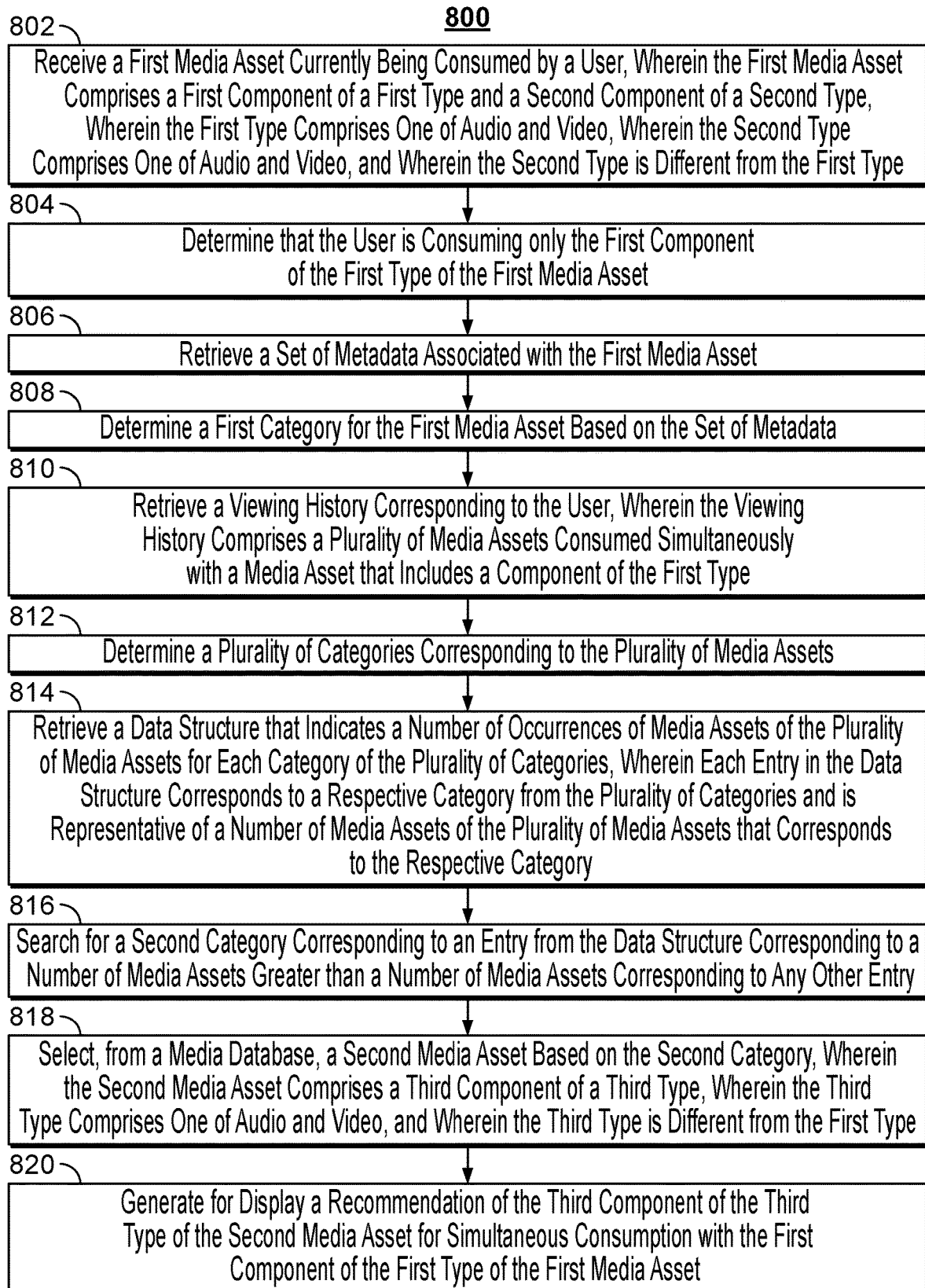
FIG. 8 depicts an illustrative flowchart of a process for, while a user is consuming a first media asset, generating for the user a recommendation of a second media asset based on a viewing history of the user, in accordance with some embodiments of the disclosure.

FIG. 8 depicts an illustrative flowchart of a process for, while user 102 is consuming a first media asset 106, generating for user 102 a recommendation of a second media asset 108 based on a viewing history of user 102, in accordance with some embodiments of the disclosure. Process 800 may be executed by control circuitry 604 (e.g., in a manner instructed to control circuitry 604 by the media guidance application). Control circuitry 604 may be part of remote server separated from user 102 by of communication network 714.

Process 800 starts at step 802 when control circuitry 604 receives a first media asset 106 currently being consumed by user 102. Further, the first media asset 106 comprises a first component of a first type and a second component of a second type. Additionally, the first type comprises one of audio and video, wherein the second type comprises one of audio and video, and wherein the second type is different from the first type. For example, the media guidance application may receive a baseball game currently being watched by user 102.

At step 804, control circuitry 604 determines that user 102 is consuming only the first component of the first type of the first media asset 106. For example, the media guidance application may determine that user 102 is only watching the baseball game, with the sound muted, thus consuming only the video of the baseball game.

At step 806, control circuitry 604 retrieves a set of metadata associated with the first media asset 106. For example, the media guidance application may retrieve the metadata associated with the baseball game.

At step 808, control circuitry 604 determines a first category for the first media asset 106 based on the set of metadata. For example, the media guidance application may determine that the baseball game is a sport event based on the metadata.

At step 810, control circuitry 604 retrieves a viewing history corresponding to user 102. The viewing history includes media assets consumed simultaneously with a media asset that includes a component of the first type. For example, the media guidance application may retrieve the viewing history of user 102 including information about previous times when user 102 watched a muted sport event and listened to another program.

At step 812, control circuitry 604 determines a plurality of categories corresponding to the plurality of media assets. For example, the media guidance application may determine that, in the past when user 102 watched muted sports events, he or she either listened to podcasts or the news.

At step 814, control circuitry 604 retrieves a data structure that indicates a number of occurrences of media assets of the plurality of media assets for each category of the plurality of categories. Each entry in the data structure corresponds to a respective category from the plurality of categories and is representative of a number of media assets of the plurality of media assets that corresponds to the respective category. For example, the media guidance application may retrieve a data structure that indicates that user 102 previously watched a muted sport event and listened to a podcast ten times and user 102 previously watched a muted sport event and listened to news ninety times.

At step 816, control circuitry 604 searches for a second category corresponding to an entry from the data structure corresponding to a number of media assets greater than a number of media assets corresponding to any other entry. For example, the media guidance application may determine that the second category is news since user 102 listened to news more often than to listened to podcasts while watching a muted sport event.

At step 818, control circuitry 604 selects, from a media database, a second media asset 108 based on the second category. Further, the second media asset 108 comprises a third component of a third type. The third type comprises one of audio and video, and the third type is different from the first type. For example, the media guidance application may select a CNN News program that has at least an audio component but may also have the video component.

At step 820, control circuitry 604 generates for display a recommendation of the third component of the third type of the second media asset 108 for simultaneous consumption with the first component of the first type of the first media asset 106. Display 612 or speakers 614 may be used to generate the recommendation for display. User 102 may reject or accept recommendation by selecting selectable options 110 or 112, respectively. User 102 may use user input interface 610 to select selectable options 110 or 112. For example, the media guidance application may recommend that user 102 listens to the CNN News program while watching the muted baseball game.

Figure 9:
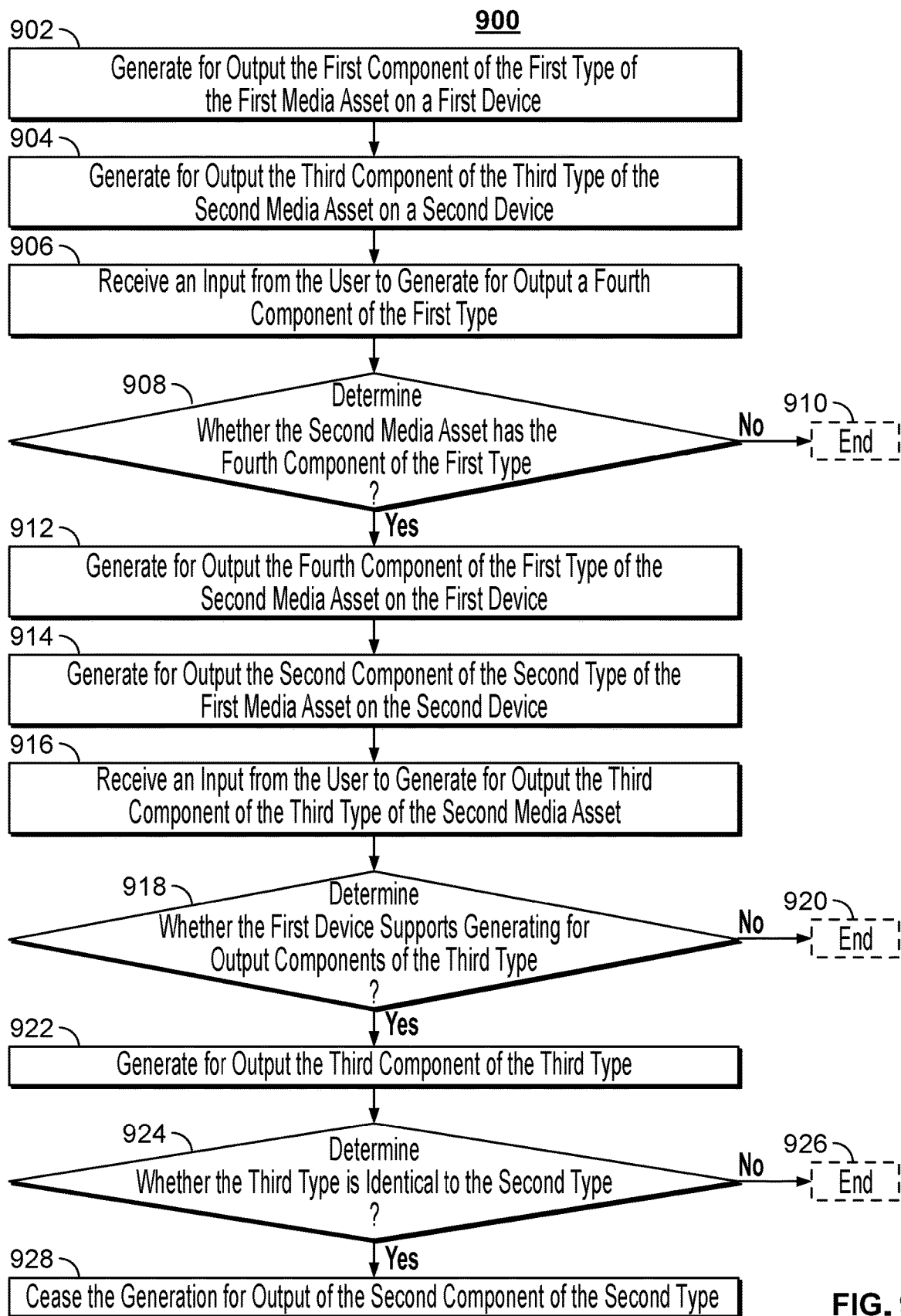
FIG. 9 depicts another illustrative flowchart of a process for, while a user is consuming a first media asset, generating for the user a recommendation of a second media asset based on a viewing history of the user, in accordance with some embodiments of the disclosure.

FIG. 9 depicts another illustrative flowchart of a process for, while user 102 is consuming a first media asset 106, generating for user 102 a recommendation of a second media asset 108 based on a viewing history of user 102, in accordance with some embodiments of the disclosure. Process 900 may be executed by control circuitry 604 (e.g., in a manner instructed to control circuitry 604 by the media guidance application). Control circuitry 604 may be part of a remote server separated from user 102 by communication network 714.

Process 900 starts at step 902 when control circuitry 604 generates for output the first component of the first type of the first media asset 106 on a first device 104. Control circuitry 604 may use display 612 or speakers 614 to generate for output components of media assets. For example, the media guidance application may allow user 102 to watch the muted baseball game on a first television.

At step 904, control circuitry 604 generates for output the third component of the third type of the second media asset 108 on a second device 202. For example, the media guidance application may use a second television to play the audio from the CNN News.

At step 906, control circuitry 604 receives an input from user 102 to generate for output a fourth component of the first type. For example, the media guidance application may receive an input from user 102 to start showing the video of the CNN News program.

At step 908, control circuitry 604 determines whether the second media asset 108 has the fourth component of the first type. For example, the media guidance application may determine whether the CNN News program has a video track.

If, at step 908, control circuitry 604 determines that the second media asset 108 does not have the fourth component of the first type, process 900 can optionally end at step 910.

If, at step 908, control circuitry 604 determines that the second media asset 108 has the fourth component of the first type, process 900 continues to step 912. At step 912, control circuitry 604 generates for output the fourth component of the first type of the second media asset 108 on the first device 104. For example, the media guidance application may, in response to determining that the CNN News program has a video track, display the video of the CNN News program on the first TV.

At step 914, control circuitry 604 generates for output the second component of the second type of the first media asset 106 on the second device 202. For example, the media guidance application may generate for output the audio of the baseball game on the second TV.

At step 916, control circuitry 604 receives an input from user 102 to generate for output the third component of the third type of the second media asset 108. For example, the media guidance application may receive an input from user 102 to generate for output the audio track of the CNN News program.

At step 918, control circuitry 604 determines whether the first device 104 supports generating for output components of the third type.

If, at step 918, control circuitry 604 determines that the first device 104 does not support generating for output components of the third type, process 900 can optionally end at step 920.

If, at step 918, control circuitry 604 determines that the first device 104 supports generating for output components of the third type, process 900 continues to step 922. At step 922, control circuitry 604 generates for output the third component of the third type.

At step 924, control circuitry 604 determines whether the third type is identical to the second type.

If, at step 924, control circuitry 604 determines that the third type is not identical to the second type, process 900 can optionally end at step 926.

If, at step 924, control circuitry 604 determines that the third type is identical to the second type, process 900 continues to step 928. At step 928, control circuitry 604 ceases the generating for output of the second component of the second type.

Figure 10:
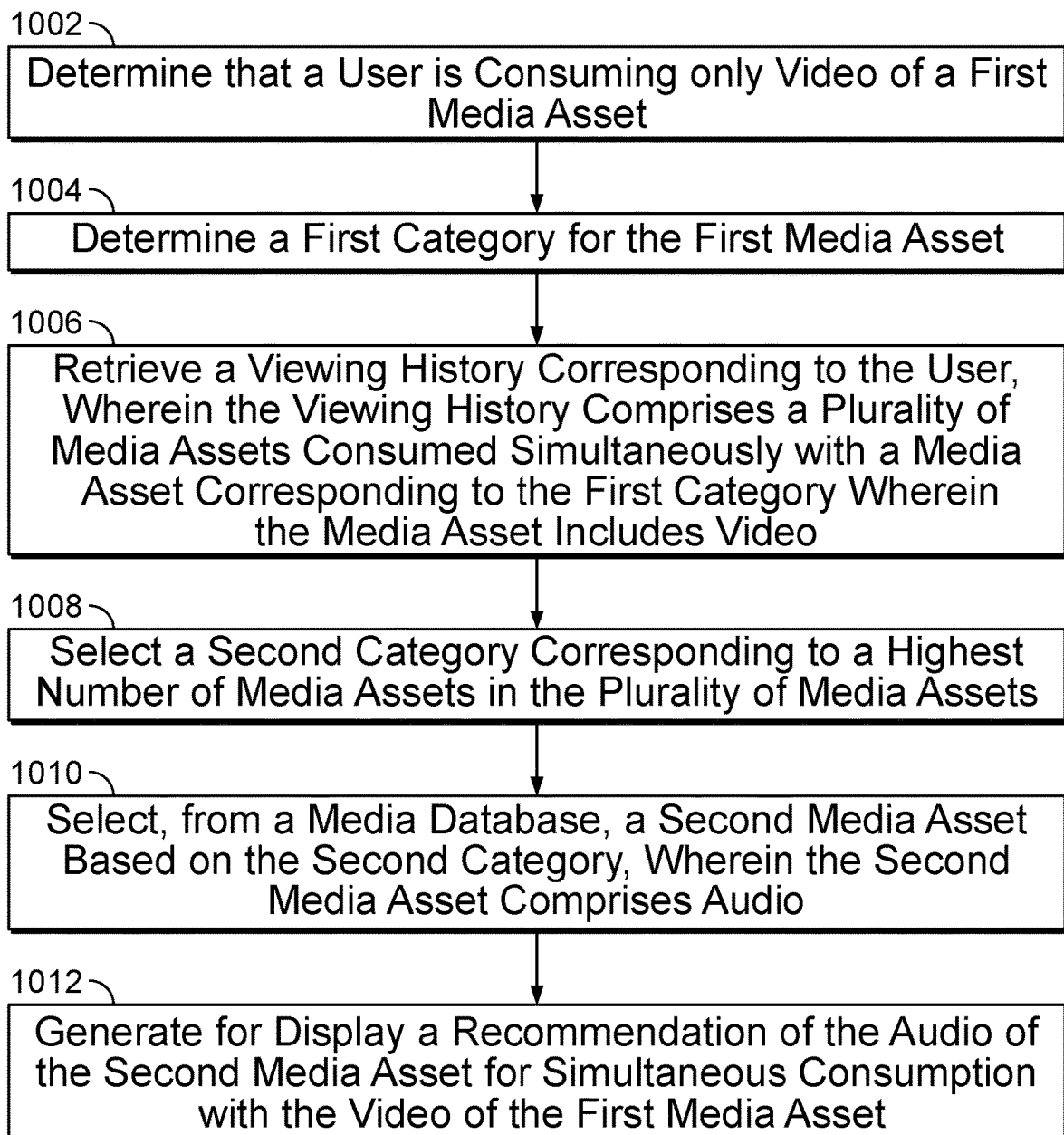
FIG. 10 depicts yet another illustrative flowchart of a process for, while a user is consuming a first media asset, generating for the user a recommendation of a second media asset based on a viewing history of the user, in accordance with some embodiments of the disclosure.

FIG. 10 depicts yet another illustrative flowchart of a process for, while user 102 is consuming a first media asset 106, generating for user 102 a recommendation of a second media asset 108 based on a viewing history of user 102, in accordance with some embodiments of the disclosure. Process 1000 may be executed by control circuitry 604 (e.g., in a manner instructed to control circuitry 604 by the media guidance application). Control circuitry 604 may be part of remote server separated from user 102 by of communication network 714.

Process 1000 starts at step 1002 when control circuitry 604 determines that user 102 is consuming only video of a first media asset 106.

At step 1004, control circuitry 604 determines a first category for the first media asset 106.

At step 1006, control circuitry 604 retrieve a viewing history corresponding to user 102. The viewing history includes media assets consumed simultaneously with a media asset that corresponds to the first category and that includes video.

At step 1008, control circuitry 604 selects a second category corresponding to a highest number of media assets in the plurality of media assets;

At step 1010 control circuitry 604 selects, from a media database, a second media asset 108 based on the second category. The second media asset 108 comprises audio.

At step 1012, control circuitry 604 generates for display a recommendation of the audio of the second media asset 108 for simultaneous consumption with the video of the first media asset 106. Display 612 or speakers 614 may be used to generate the recommendation for display. User 102 may reject or accept recommendation by selecting selectable options 110 or 112, respectively. User 102 may use user input interface 610 to select selectable options 110 or 112.

It should be noted that processes 800-1000, or any step thereof, could be performed on, or provided by, any of the devices shown in FIGS. 4-7. For example, any of processes 800-1000 may be executed by control circuitry 604 (FIG. 6) as instructed by control circuitry implemented on user equipment 702, 704, and 706 (FIG. 7), and/or a user equipment for selecting a recommendation. In addition, one or more steps of processes 800-1000 may be incorporated into or combined with one or more steps of any other process or embodiment.

It is contemplated that the steps or descriptions of each of FIGS. 8-10 may be used with any other embodiment of this disclosure. In addition, the steps and descriptions described in relation to FIGS. 8-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-7 could be used to perform one or more of the steps in FIGS. 8-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 704, media content source 716, or media guidance data source 718. For example, a profile, as described herein, may be stored in, and retrieved from, storage 608 of FIG. 6, or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for simultaneous consumption:
   (a) a first component of a first content, the first content associated with a first category and the first component being of a first type, and
   (b) a second component of a second content, the second content is associated with a second category and the second component being of a second type,
   wherein the second content also comprises a third component of the first type;
   wherein a viewing history indicates a preference of simultaneously consuming the first content of the first type of the first category with the second content of the second type of the second category;
   during simultaneous consumption of only the first component and the second component: receiving a user input indicating a selection of (a) the third component of the first type and (b) the second content; and in response to receiving the user input: ceasing generating for consumption the first component of the first type of the first content; and generating for consumption the third component of the first type of the second content.

2. The method of claim 1, wherein the first type is video and the second type is audio.

3. The method of claim 1, wherein the first type is audio and the second type is video.

4. The method of claim 1, wherein the generating for simultaneous consumption is on a same device; wherein in response to receiving the user input: the ceasing generating for consumption the first component of the first type of the first content is on the same device; and the generating for consumption the third component of the first type of the second content is on the same device.

5. The method of claim 1, wherein the generating for simultaneous consumption: (a) the first component of the first content is on a first device, and (b) the second component of the second content is on a second device; and wherein in response to receiving the user input: the ceasing generating for consumption the first component of the first type of the first content is on the first device; and the generating for consumption the third component of the first type of the second content is on the second device.

6. The method of claim 1, wherein the generating for simultaneous consumption: (a) the first component of the first type of the first content is on a first device, and (b) the second component of the second type of the second content is on a second device; and wherein in response to receiving the user input: the ceasing generating for consumption the first component of the first type of the first content is on the first device; and the generating for consumption the third component of the first type of the second content is on the first device.

7. The method of claim 6, further comprising, in response to receiving the user input: ceasing generating for consumption the second component of the second type of the second content on the second device; generating for consumption a fourth component of the second type of the first content on the second device, wherein the first content also comprises the fourth component of the second type.

8. A system comprising: control circuitry configured to:
   generate for simultaneous consumption:
   (a) a first component of a first content, the first content associated with a first category and the first component being of a first type, and
   (b) a second component of a second content, the second content associated with a second category and the second component being of a second type,
   wherein the second content also comprises a third component of the first type; and input/output circuitry configured to:
   wherein a viewing history indicates a preference of simultaneously consuming the first content of the first type of the first category with the second content of the second type of the second category;
   during simultaneous consumption of only the first component and the second component: receive a user input indicating a selection of (a) the third component of the first type and (b) the second content; and wherein the control circuitry is configured to: in response to receiving the user input: cease generating for consumption the first component of the first type of the first content; and generate for consumption the third component of the first type of the second content.

9. The system of claim 8, wherein the first type is video and the second type is audio.

10. The system of claim 8, wherein the first type is audio and the second type is video.

11. The system of claim 8, wherein the control circuitry is configured to generate for simultaneous consumption on a same device; wherein the control circuitry is configured to in response to receiving the user input: cease generating for consumption the first component of the first type of the first content on the same device; and generate for consumption the third component of the first type of the second content on the same device.

12. The system of claim 8, wherein the control circuitry is configured to generate for simultaneous consumption: (a) the first component of the first type of the first content on a first device, and (b) the second component of the second type of the second content on a second device; and wherein the control circuitry is configured to in response to receiving the user input: cease generating for consumption the first component of the first type of the first content on the first device; and generate for consumption the third component of the first type of the second content on the second device.

13. The system of claim 8, wherein the control circuitry is configured to generate for simultaneous consumption: (a) the first component of the first type of the first content on a first device, and (b) the second component of the second type of the second content on a second device; and wherein in response to receiving the user input: cease generating for consumption the first component of the first type of the first content on the first device; and generate for consumption the third component of the first type of the second content on the first device.

14. The system of claim 13, wherein the control circuitry is further configured to, in response to receiving the user input: cease generating for consumption the second component of the second type of the second content on the second device; generate for consumption a fourth component of the second type of the first content on the second device, wherein the first content also comprises the fourth component of the second type.

\* \* \* \* \*